United States Patent

Huisman et al.

[11] Patent Number: 5,948,207
[45] Date of Patent: Sep. 7, 1999

[54] ASSEMBLY OF DEVICES FOR BUILDING A GREEN TIRE FOR VEHICLES

[75] Inventors: Henk Huisman, DA Epe; Wubbo Pieter De Vries, NZ Hoogeveen; Martin De Graaf, KM EMST; Martinus Regterschot, NG Wapenveld, all of Netherlands

[73] Assignee: VMI Epe Holland B.V., Epe, Netherlands

[21] Appl. No.: 09/043,484

[22] PCT Filed: Feb. 7, 1997

[86] PCT No.: PCT/NL97/00041

§ 371 Date: Mar. 17, 1998

§ 102(e) Date: Mar. 17, 1998

[87] PCT Pub. No.: WO97/28957

PCT Pub. Date: Aug. 14, 1997

[30] Foreign Application Priority Data

Feb. 12, 1996 [NL] Netherlands ............... 1002306

[51] Int. Cl.⁶ ..................................... B29D 30/20
[52] U.S. Cl. ............... 156/396; 156/397; 156/405.1; 156/406.2; 156/408
[58] Field of Search .................. 156/396, 397, 156/405.1, 406.2, 406.4, 408, 111, 117, 123, 126, 127, 130, 133

[56] References Cited

U.S. PATENT DOCUMENTS

| 4,105,487 | 8/1978 | Suzuki et al. ............... 156/406.2 |
| 4,753,707 | 6/1988 | Crombie ..................... 156/396 |
| 5,730,829 | 3/1998 | Conger et al. ............... 156/396 |

FOREIGN PATENT DOCUMENTS

| 026315 | 4/1981 | European Pat. Off. . |
| 223317 | 5/1987 | European Pat. Off. . |
| 242689 | 10/1987 | European Pat. Off. . |
| 503532 | 9/1992 | European Pat. Off. . |
| 597125 | 5/1994 | European Pat. Off. . |
| 627302 | 12/1994 | European Pat. Off. . |
| 504674 | 3/1977 | U.S.S.R. ................... 156/396 |

*Primary Examiner*—Geoffrey L. Knable
*Attorney, Agent, or Firm*—Ladas & Parry

[57] ABSTRACT

Assembly for building a green or non-vulcanized tire for vehicles, such as passenger cars, the assembly being provided with two, separately drivable, building drums (13, 16), in line with each other, for the belt and the tread; two carcass drums (40, 40') located parallel to each other, mounted on a common, rotatable shaft (39), the rotatable shaft being rotatable such that the one Carcass drum (40) and the other carcass drum (40'), respectively, can be in line with the building drums; a first (14) and a second (19) transfer ring, both movably disposed on a transfer track (18), the first transfer ring (14) being movable between the belt building drums (13, 16) and the second transfer ring (19) being movable between the carcass drums (40, 40') and the closest building drum; a breaker ply servicer (30) and a cap ply unit (31) for supplying tire components to a first building drum (13); a tread servicer (32) and a winding unit (15) for supplying tire components to a building drum; a bead holding (27) and bead placing unit (21) and a carcass component servicer (29) for supplying tire components to a carcass drum (22) in line with the building drums, a tread stitcher (28) for stitching an assembly of inter alia a breaker ply and tread against the carcass components provided on a carcass drum (22) in line with the building drums for forming a green tire; and a removing unit (20) for removing the green tire from the second transfer ring.

3 Claims, 4 Drawing Sheets

ASSEMBLY OF DEVICES FOR BUILDING A GREEN TIRE FOR VEHICLES

The present invention relates to an assembly of devices for building a green tire, that is to say a non-vulcanized tire, hereafter in the description referred to as green tire, for vehicles, such as passenger cars.

Although many of such assemblies of devices are known, such as for instance from U.S. Pat. Nos. 5,213,651 and 5,399,225, there has up to now not been an assembly, or in other words combination, of known devices which is used for building a green tire, in which these devices are interrelated in a certain way, capable of providing an assembly which allows for a high production of green tires, a high flexibility in the type of tire produced, as well as a high quality of the green tire.

It is in fact an object of the present invention to provide an example of an assembly of devices for building a green tire which is capably of this.

According to the invention, an assembly of devices is provided for building a non-vulcanized or green tire for vehicles, the assembly being provided with a first machine house with two, coaxially disposed, belt building shafts extending in a first horizontal main direction, a first of the two belt building shafts carrying a belt building drum and a second of the two belt building shafts carrying a tread building drum, the tread building drum, seen in the direction of the first horizontal main direction, being disposed at a greater distance from the first machine house than the belt building drum, and with a belt building drive for separately driving the two belt building shafts, a second machine house with a shaft rotating about a second horizontal main direction, the second horizontal main direction being parallel to the first horizontal main direction and the second machine house, seen in the direction of the first horizontal main direction, being disposed at a greater distance from the first machine house than the tread building drum, the rotating shaft of the second machine house carrying two carcass shafts disposed at a distance from and parallel to each other, each carcass shaft being parallel to the first main direction, a first of the two carcass shafts carrying a first carcass drum and a second of the carcass shafts carrying a second carcass drum, and with a main shaft drive for causing the rotating shaft to rotate and two carcass shaft drives for separately driving the two carcass shafts, the first and the second carcass shaft, respectively, being rotatable by the rotating shaft up to being in line with the first main direction, a transfer track with a direction of transfer parallel to the first horizontal main direction wherein the transfer track, seen in vertical direction, is disposed below the belt building drum and the tread building drum and extends, seen in vertical direction, up to below a carcass drum rotated in line with the first main direction, a first transfer ring disposed on the transfer track and movable between the belt building drum and the tread building drum, a second transfer ring disposed on the transfer track and movable between the tread building drum and a carcass drum rotated in line with the first main direction, a breaker ply servicer for supplying breaker plies to the belt building drum, a car ply unit disposed below the breaker ply servicer, seen in vertical direction, for supplying rubber-surrounded nylon cords to the belt building drum, a tread servicer for supplying treads to the tread building drum, a winding unit, disposed on the first transfer ring, for supplying a nylon cap ply to the belt or tread building drum, a bead holding and bead placing unit, movably disposed on the transfer track for supplying beads to a carcass drum rotated in line with the first main direction, a carcass component servicer for supplying carcass components to the other carcass drum when one of the carcass drums is rotated in line with the first main direction, a tread stitcher disposed below the carcass component servicer with at least one stitching roll for stitching an assembly of inter alia breaker ply and tread against the carcass components provided on a carcass drum rotated in line with the first main direction for producing a green tire, and a removal unit for removing a green tire from the second transfer ring. This specific mutual disposing of the devices constituting the assembly renders it possible to produce a high quality green tire in a very reproducible way within 40 seconds, while moreover a variety of tire types can be manufactured on the assembly by using different tire components.

A further reduction of the cycle time for building a green tire, so a further increase in production, can be obtained when the second transfer ring is provided with a gate, bounded on all sides, or with a gate, open on one side, for the radial passage of the at least one stitching roll.

Some embodiments of an assembly according to the invention will now by way of example be described on the basis of the drawing. In the drawing.

Since the present invention is directed at the mutual positioning of known devices used in building a green tire, and not at an invention relating to one of the devices itself, the following description of the function and design of these devices will be brief, in order to prevent the description from becoming unnecessarily complex and bulky, all the more so since such a brief description provides sufficient information for a person skilled in the art of building a green tire with regard to those devices which are useful to realize a working assembly according to the invention.

Figure 1:
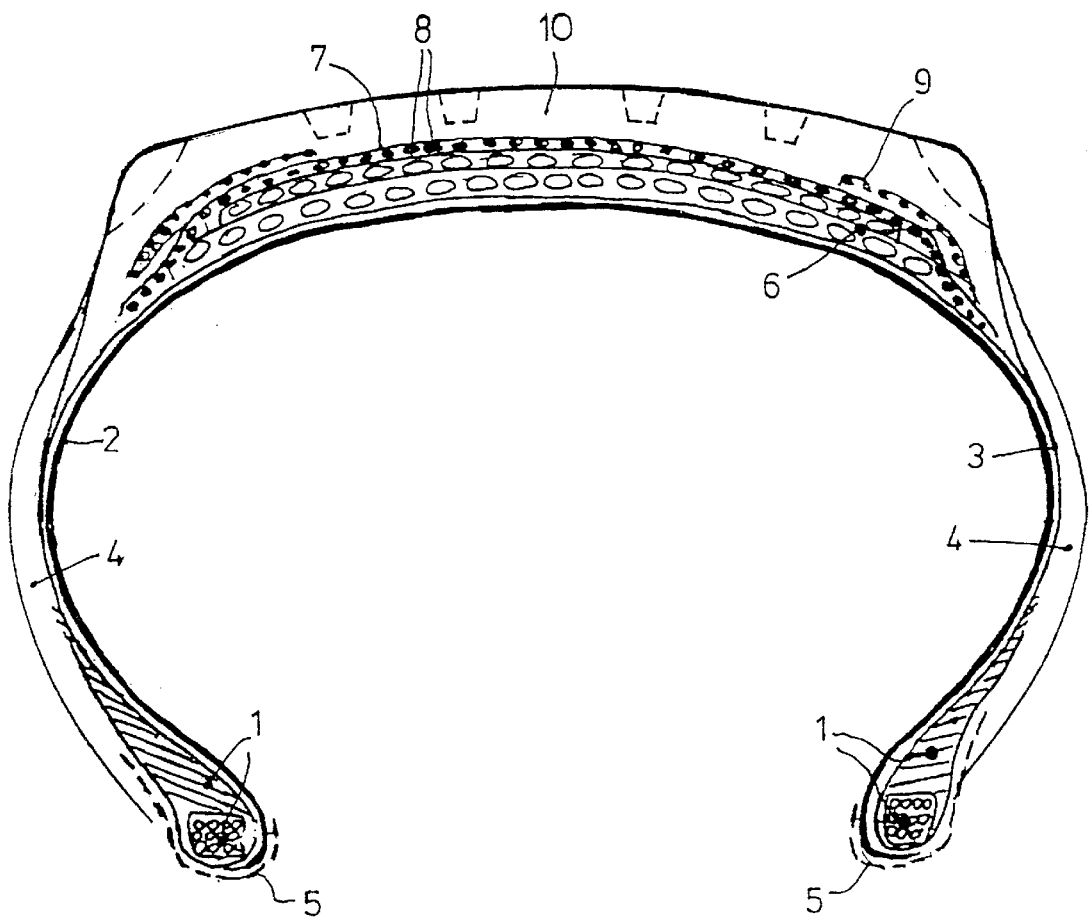
FIG. 1 shows a cross-section of a green tire for a fast luxury passenger car.

In order to clarify the terms used hereafter in the description, the tire components which are present in a radial tire for a fast luxury car will be briefly described on the basis of FIG. 1, showing a schematic cross-section of a green tire. However, the invention is not restricted to such a type of green tire, since tire components can easily be left out, replaced or added.

The green, non-vulcanized tire according to FIG. 1 is provided with two bead wire bundles 1 with apex which each constitute a bead, an airtight inner liner 2, one or more carcass plies 3 of which the ply edges are turned up around the bead, two side walls of rubber 4, two squarewoven chafers 5 in the bead area or alternatively two wear-resistant rubber strips, a belt 6 consisting of two belt plies with mutual corssing steel cords, a cap ply 7 containing circumferential nylon cords 8 which can be present, if so desired, in two layers, but of which the leading and trailing end is cut at for instance 45° or 30°, while the vulnerable belt edges can be provided with an endless wound rubber-surrounded nylon cord 9 with a last component, a tread 10, of which the thin ending edges end on the previously mentioned side walls 4 or end in an alternative preferred embodiment underneath the side walls 4.

These two latter embodiments are also referred to a tread over sidewall (T.O.S.) or sidewall over tread (S.O.T.). FIG. 1 shows a tire of the S.O.T. type.

Figure 2:
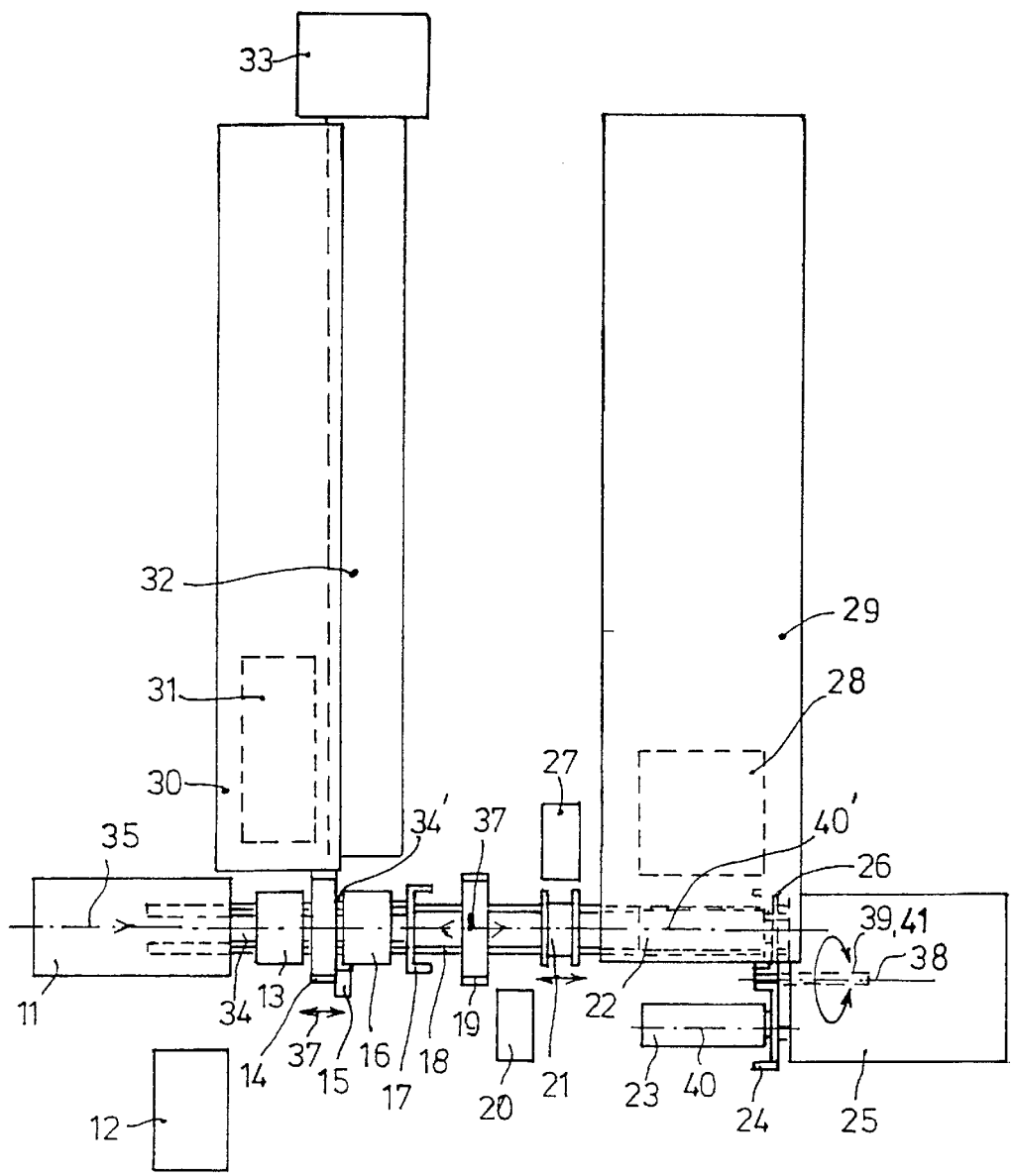
FIG. 2 shows a schematic top view of an assembly according to the invention.
Figure 3:
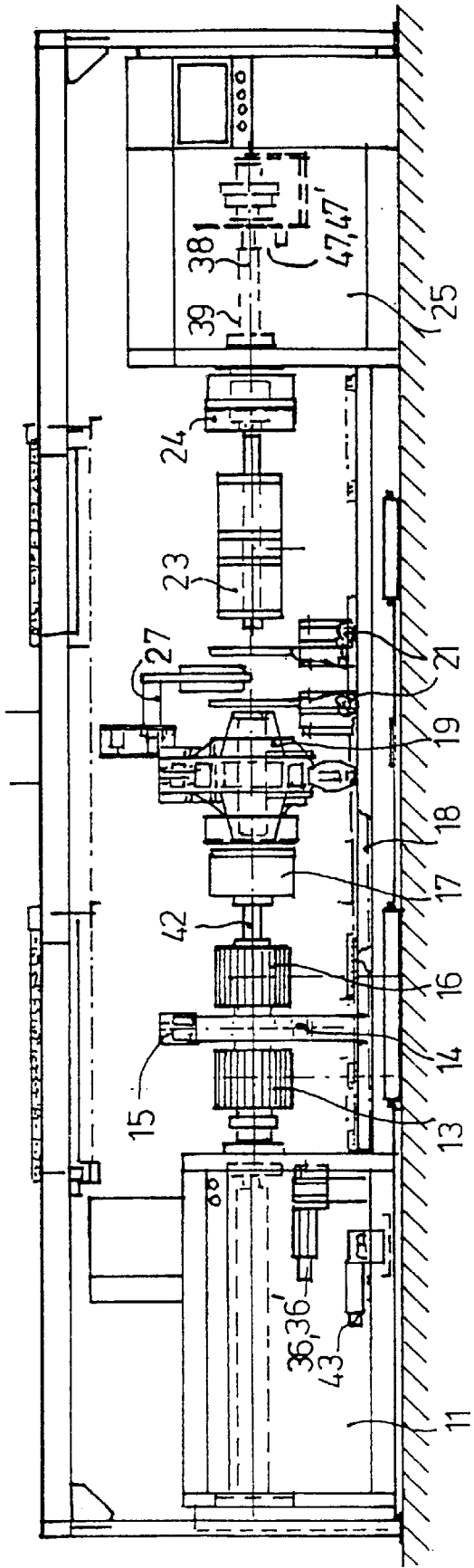
FIG. 3 shows a front view of the assembly according to FIG. 2.

A green tire as shown in FIG. 1 is built according to the invention at high speed and high quality on an assembly of devices as schematically represented in top view in FIG. 2 and in front view in FIG. 3. The inventive assembly comprises a first machine house 11 with two, coaxially disposed, projecting belt building shafts 34 and 34'. The belt building shafts 34 and 34' extend in a first horizontal main direction 35. The first belt building shaft 34 carries a belt building drum 13 and the second belt building shaft 34' carries a tread building drum 16. The tread building drum 16, seen in the direction of the first horizontal main direction 35, is disposed at a greater distance from the first machine house 11 than the belt building drum 13. The first machine house 11 further comprises a belt building drive 36 and 36', preferably servo-driven, for separately driving the two belt building shafts 34, 34' and therefore the belt building drum 13 and the treat building drum 16.

The drums 13 and 16 are preferably entirely identical and comprise in the known manner an internal mechanism which can let for instance 24 magnet segments on the outside of the drum adopt a smaller diameter, for removing belt or belt and tread components. When the belt should not contain steel cords then, instead of building drums with magnets, known building drums can be used which work on air pressure from underneath. The building drums 13 and 16 can rotate and be operated independently from each other, but are otherwise stationary.

The inventive assembly also comprises a breaker ply servicer 30 for supplying belt plies which have been cut to size to the belt building drum 13. This breaker ply servicer 30, which can for instance be similar to NL-A-9301717, causes a first belt ply and subsequently a second belt ply, the cord direction of which is contrary to the cord direction of the first belt ply to be wound around the belt building drum 13. For green tires for passenger cars of limited speed, the assembly of these two belt plies to form a belt will suffice. When making a belt as shown in FIG. 1, the assembly according to the present invention comprises a known cap ply unit 31 disposed below the breaker ply servicer 30, seen in vertical direction, for supplying rubber-surrounded nylon cords to the belt building drum 13. The cap ply unit 31 comprises a cutting unit for cutting the nylon cap ply to size and under a desired angle of for instance 45° or 30°, which nylon cap ply can be wound around the belt plies already wound on this drum by way of one or two rotations of the belt building drum 13.

The inventive assembly further comprises a transfer track 18 with a direction of transfer 37 parallel to the first main direction 35. The transfer track 18, seen in vertical direction, is disposed below the building drums 13 and 16. The transfer track 18 carries a first transfer ring 14 of a known type, belonging to the assembly, which is movable between the belt building drum 13 and the tread building drum 16. The transfer ring 14 transfers the belt provided on the belt building drum to the tread building drum.

From a reel 12 with an endless strip of nylon cord embedded in rubber, a nylon cap ply can be supplied to the tread building drum 16 via a known winding unit 15 disposed on the first transfer ring 14. By varying the pitch of the winding unit 15, any desired distribution pattern can be made, an advantage of this being that there is no splice or overlap visible. As a consequence of the possibility of applying a nylon cap ply by winding a narrow strip by spiralling it, as desired, onto belt building drum 13 or tread building drum 16, the wide cap ply (number 7 in FIG. 1) could be omitted.

A tread is supplied to the tread building drum 16 by a tread servicer 32 and wound around the belt present on the tread building drum 16. The tread may come from a supply reel 33 with endless strip of tread material, which is cut obliquely in a known manner by means of for instance an ultrasonic knife.

After this, the belt and tread package is complete and this package is removed from the tread building drum 16 by a second transfer ring 19, disposed movably on transfer track 18. The second transfer ring 19 with the belt and tread package is moved to a waiting position and the next belt and tread package can be assembled on the belt building drum and the tread building drum.

The assembly according to the invention further comprises a second machine house 25 with a shaft 39 rotating about a second horizontal main direction 38. The second horizontal main direction 38 is parallel to the first horizontal main direction 35. The second machine house 25, seen in the direction of the first horizontal main direction 35, is disposed at a greater distance from the first machine house 11 than the tread building drum 16. The rotating shaft 39 carries two carcass shafts 40 and 40', disposed at a distance from and parallel to each other, each carcass shaft being parallel to the first main direction 35. The first carcass shaft 40 carries a first known carcass drum 23, and the second carcass shaft 40' carries a second identical carcass drum 22. The second machine house 25 further comprises a main shaft drive 41, preferably servo-driven, for causing the rotating shaft 39 to rotate and two carcass shaft drives 47 and 47' for separately driving the carcass shafts, and thereby the carcass drums. The second machine house 25 is arranged such, that the first and the second carcass shaft 40, 40', respectively, are rotatable by the rotating main shaft 39 up to being in line with the first main direction 35. The transfer track 18 extends up to, seen in vertical direction, below a carcass drum rotated in line with the first main direction.

From a carcass component servicer 29, the carcass components, airtight inner liner with rubber side walls and the carcass ply with cord reinforcement are successively supplied, cut to length, and wrapped around the first carcass drum 23. If desired, a second carcass ply can be applied on the first carcass drum 23 and optionally squarewoven chafer or rubber chafer strips, in accordance with NL-A-9200046.

Subsequently, both carcass drums rotate and the first carcass drum 23 comes in line with the first horizontal main direction 35 above the transfer track 18 and the second, empty carcass drum 22, arrives at the position previously held by the first carcass drum 23.

From a bead loading and supply unit 27, bead wire bundles with apex are transferred onto a bead holding and placing unit 21 movable over the transfer track 18, as this is known from for instance NL-A-8803174. This unit 21 is moved around the first carcass drum 23, on which the carcass components have already been applied, and the bead wire bundles with apex are disposed on the first carcass drum 23, upon which, by operating the carcass drum 23, the bead wire bundles with apex are clamped firmly onto the carcass ply and an airtight seal is formed, as is described in for instance NL-A-9001645.

Depending on the type of carcass drum used, the carcass plies and sidewalls are turned up in a different way around the bead wire bundles with apex. In a so-called dual bladder carcass drum, this is effected by means of four bladder. In the embodiment represented in FIGS. 2 and 3, carcass drums with only two bladders are used, which carcass drums are known per se. The turning up is now effected by means of a push-over can 17 disposed on one side of the carcass drums, said push-over can having the internal shape of a can or clock, which push-over can 17 is carried and driven by means of a piston 42 which runs through the shaft of the building drums 13 and 16 and in the first machine house 11, and a roll-over/push-over can 24, and 26, respectively, disposed on the other side of the carcass drums 23, 22. These cans 17, 24 and 26, respectively, are used to push aside both blown-up curved bladders, so that the carcass components are correctly forced against the formed carcass and the bead wire bundles.

When the carcass is completed, in this case for a tread over sidewall structure, the second transfer ring 19 with belt and tread package is moved from the waiting position up to over the first carcass drum 23 and the belt and tread package should be stitched by a tread stitching unit 28, which is disposed underneath the carcass component servicer 29 and comprises at least one stitcher roll, against the carcass components to form a green tire.

This stitching can take place after the second transfer ring 19 has disposed the belt and tread package on the carcass drum and has moved away from the carcass drum.

Figure 4:
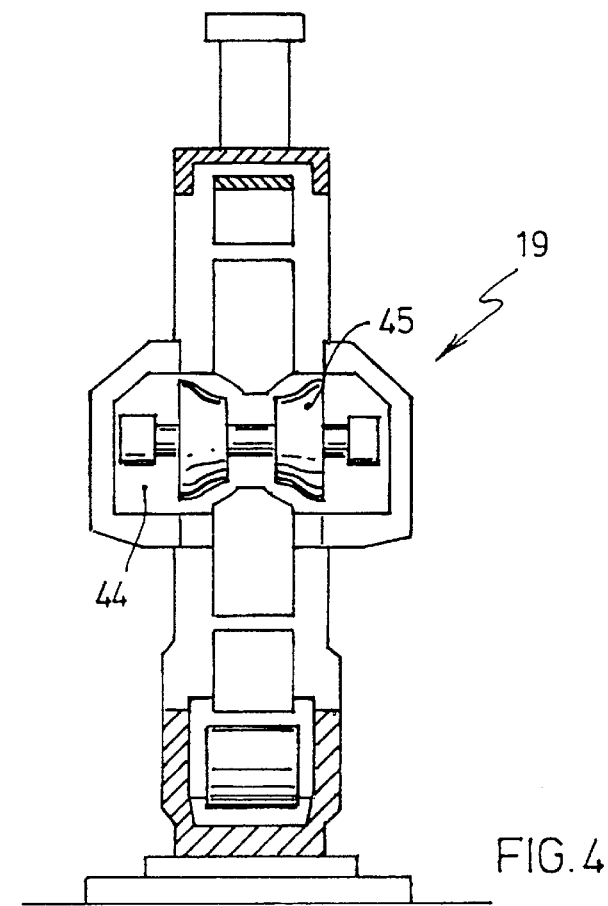
FIG. 4 shows a transfer ring with a gate, bounded on all sides.

However, in order to reduce the amount of time needed to manufacture a green tire, preferably a transfer ring 19 is used which is provided with a gate 44, bounded on all sides, for radial passage of a stitcher roll 45 of the stitching unit 28 (see FIG. 4). Consequently, the second transfer ring 19 need not be moved away from the carcass drum before stitching can commence. Such a transfer ring is known from EP-B1-0223317.

Figure 5:
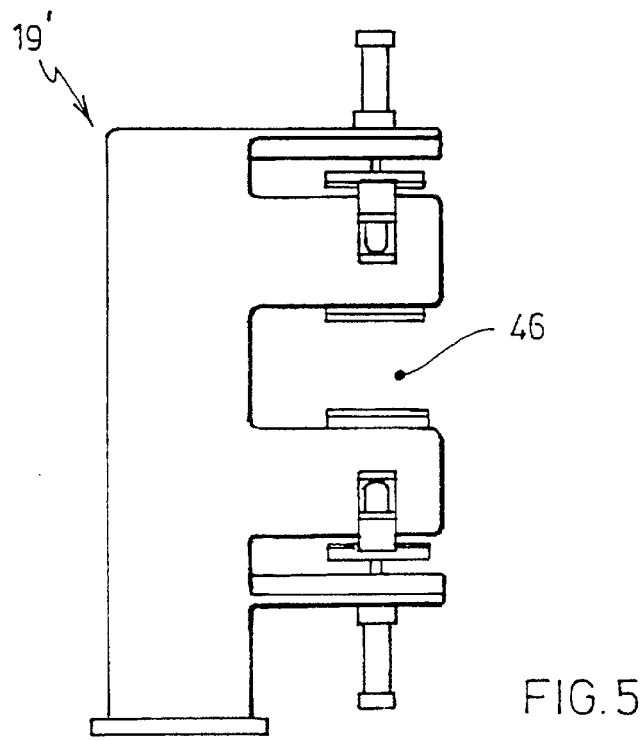
FIG. 5 shows a transfer ring with a gate, open on one side.

Alternatively, a reduction of the manufacturing time of a green tire can be obtained by using a transfer ring 19' which is provided with a gate 46, open on one side, for radial passage of a stitcher roll of the stitching unit (see FIG. 5). Such a transfer ring is known from NL-A-9300893.

The completed green tire is removed from the first carcass drum 22 by the second transfer ring 19 and transported to near the removing unit 20 which removes the green tire from the second transfer ring 19. Subsequently, the second transfer ring 19 is moved towards the tread building drum 16 for removal of the next belt and tread package and the carcass drums are exchanged so that the next green tire can be finished.

The total time needed to build a green tire with an assembly according to the present invention can be less than 40 seconds, while the entire operation of the assembly can be performed by one person. The quality of the green tires thus produced has turned out to be very good. Moreover, the assembly is extremely flexible, both as regards the type of tire to be produced and as regards the modular construction of the assembly, the interchangeability of the separate devices constituting the assembly.

We claim:

1. Assembly of devices for building a non-vulcanized or green tire for vehicles, the assembly being provided with:

a first machine house with two, coaxially disposed, belt building shafts extending in a first horizontal main direction, a first of the two belt building shafts carrying a belt building drum and a second of the two belt building shafts carrying a tread building drum, the tread building drum, seen in the direction of the first horizontal main direction, being disposed at a greater distance from the first machine house than the belt building drum, and with a belt building drive for separately driving the two belt building shafts, a second machine house with a shaft rotating about a second horizontal main direction, the second horizontal main direction being parallel to the first horizontal main direction and the second machine house, seen in the direction of the first horizontal main direction, being disposed at a greater distance from the first machine house than the tread building drum, the rotating shaft of the second machine house carrying two carcass shafts disposed at a distance from and parallel to each other, each carcass shaft being parallel to the first main direction, a first of the two carcass shafts carrying a first carcass drum and a second of the carcass shafts carrying a second carcass drum, and with a main shaft drive for causing the rotating shaft to rotate and two carcass shaft drives for separately driving the two carcass shafts, the first and the second carcass shafts, respectively, being rotatable by the rotating shaft up to being in line with the first main direction, a transfer track with a direction of transfer parallel to the first horizontal main direction wherein the transfer track, seen in vertical direction, is disposed below the belt building drum and the tread building drum and extends, seen in vertical direction, up to below a carcass drum rotated in line with the first main direction, a first transfer ring disposed on the transfer track and movable between the belt building drum and the tread building drum, a second transfer ring disposed on the transfer track and movable between the tread building drum and a carcass drum rotated in line with the first main direction, a breaker ply servicer for supplying breaker plies to the belt building drum, a cap ply unit disposed below the breaker ply servicer, seen in vertical direction, for supplying rubber-surrounded nylon cords to the belt building drum, a tread servicer for supplying treads to the tread building drum, a winding unit, disposed on the first transfer ring, for supplying a nylon cap ply to the belt or tread building drum, a bead holding and bead placing unit, movably disposed on the transfer track for supplying beads to a carcass drum rotated in line with the first main direction, a carcass component servicer for supplying carcass components to the other carcass drum when one of the carcass drums is rotated in line with the first main direction, a tread stitcher disposed below the carcass component servicer with at least one stitching roll for stitching an assembly of inter alia breaker ply and tread against the carcass components provided on a carcass drum rotated in line with the first main direction for producing a green tire, and a removal unit for removing a green tire from the second transfer ring.

2. Assembly according to claim 1, the second transfer ring being provided with a gate, bounded on all sides, for the radial passage of the at least one stitching roll.

3. Assembly according to claim 1, the second transfer ring being provided with a gate, open on one side, for the radial passage of the at least one stitching roll.

* * * * *